Feb. 16, 1954 J. P. SHELL 2,669,130
FLYWHEEL
Filed Oct. 25, 1952
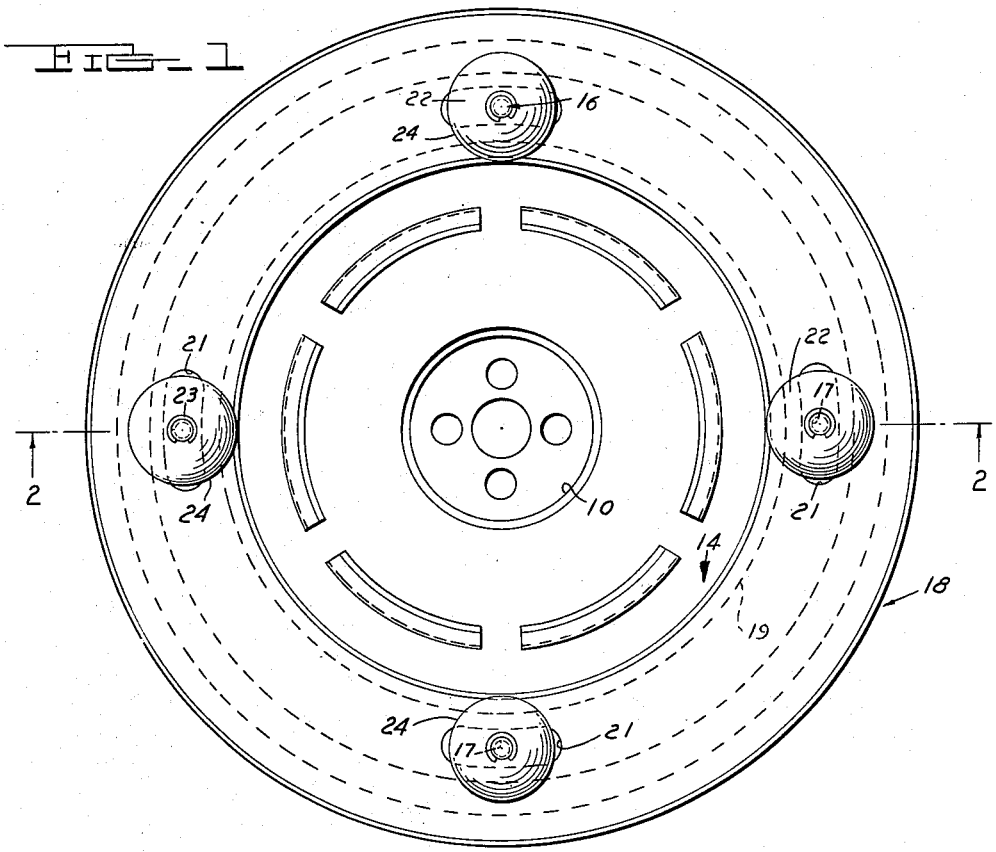
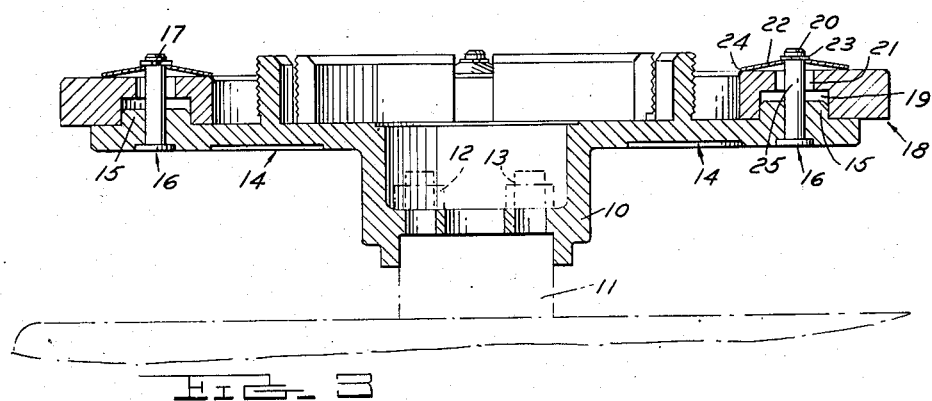
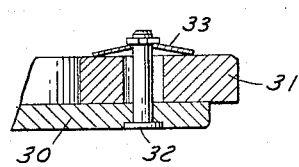
INVENTOR.
JULIUS P. SHELL
BY
ATTORNEY Patented Feb. 16, 1954

2,669,130

UNITED STATES PATENT OFFICE 2,669,130

FLYWHEEL

Julius P. Shell, Detroit, Mich., assignor to Douglas Tool Company, a corporation of Michigan Application October 25, 1952, Serial No. 316,847

2 Claims. (Cl. 74—574)

This invention relates to fly-wheels for outboard motors and in particular to a variable torque compensating tunable fly-wheel for eliminating the vibration incident to variations of angular velocity of the crankshaft and associated parts such as in a fixed radial engine.

Fly-wheels have long been known and are usually heavy wheels for opposing and moderating by their inertia any fluctuation of speed in the machinery with which they revolve such as especially on an engine crankshaft to counteract variable torque during the stroke and to carry the engine over the dead centers. Fly wheels have long depended on mass to perform their function especially in relation to dampening vibration. In some instances mass can be commercially employed without limitation such as in stationary steam engines, whereas in other instances, mass is the first commercial limitation such as in portable marine outboard motors.

With the foregoing in view, the primary object of the invention is to provide a relatively light fly-wheel, particularly suited for outboard motors, which is capable of dampening the vibration incident to variations in crankshaft angular velocity by its design rather than its mass.

An object of the invention is to provide a two-piece fly-wheel composed of a center disc portion and a floating outer ring portion so integrated as to be capable of different angular velocities during minute periods of time.

An object of the invention is to provide a slippable spring pressed frictional engagement between the disc portion and the floating ring portion so as to cushion-wise impose the movement of one portion on the other during different angular movement of one portion relative to the other.

An object of the invention is to provide studs in one portion and arcuate slots in the other portion surrounding the studs in non-contacting relationship so that one portion can pivot or turn relatively small amounts relative to the other without mechanical prohibition.

An object of the invention is to provide springs of pre-selected characteristics, such as Beldon spring washers, associated with the studs, disc, and ring portions so as to press the portions into frictional engagement with pre-selected and desired force.

An object of the invention is to provide a fly-wheel to dampen vibration in the engine as a whole thereby eliminating transfer of vibration to the object on which the engine is mounted.

An object of the invention is to provide flexible studs which absorb initial angular velocity variations between the two portions.

An object of the invention is to provide spring contacting one portion with greater resistance than the frictional resistance between the portions so as to initially flex the studs when one portion moves relative to the other and to subsequently slide the springs relative to the portion on which they bear.

An object of the invention is to provide a fly-wheel which can be tuned by varying the stud length, diameter, hardness, ductility, etc., and by varying the spring size, force, and area of surface bearing on a portion.

An object of the invention is to provide a self-tuning fly-wheel which is easy and economical to manufacture, simple in design and construction, durable and fool proof in use, and which can readily be mounted on any type or style of engine.

These and other objects of the invention will become apparent by reference to the following description of a tunable, self compensating fly-wheel embodying the invention taken in connection with the accompanying drawing in which:

Fig. 1 is a top plan view of the device.

Fig. 2 is a cross-sectional view taken on the line 2—2 of Fig. 1; and

Fig. 3 is a fragmentary sectional view showing a modification of the device.

Referring now to the drawing wherein like numerals refer to like and corresponding parts throughout the several views, the fly-wheel disclosed therein to illustrate the invention comprises a hub portion 10 adapted to be bolted to a crankshaft 11 by nuts 12 and bolts 13 or otherwise suitably secured thereto as by splining or keying; a disc portion 14 emanating radially from the hub 10; a circumferential, annular, or segmental arcuate ridge 15 on the disc portion 14; studs 16 embedded in the disc portion 14 cantilevered or projecting outwardly from the disc portion 14 having snap-ring grooves 17 adjacent their ends 20; a tire-like ring 18 having a circumferential, annular, or segmental arcuate channel 19 adapted to mate with the ridge 15 so that the ridge 15 is received within the channel 19 radially positioning the disc portion 14 and the ring portion 18 so that they are concentric; the ring portion 18 having apertures or arcuate slots 21 adapted to receive the ends 20 of the studs 16 therethrough so that the side walls of the ring portion 18 defining the slots 21 are spaced from the shank portions 25 of the studs 16. It can now be seen that the ring portion 18 is capable of limited pivotal movement relative to the disc portion 14 and vice-versa with the ridge 15 and mating channel 19 maintaining the parts concentric with each other.

The disc portion 14 and ring portion 18 are spring pressed together in frictional engagement such as by the spring washers 22 which are secured to the ends 20 of the studs 16 by the snap ring 23. The spring washers 22 bear against the ring portion 18 urging the contacting surfaces of the ring portion 18 and disc portion 14 together in frictional engagement. It can now be seen that free pivotal movement of the ring portion 18 relative to the disc portion 14 is restrained by the spring pressed frictional engagement between the parts.

In operation, with the inventive fly-wheel mounted on the crankshaft of a running engine, the ring portion 18 rotates on the mean angular velocity of the crankshaft while the disc portion 14 follows any angular velocity variations of the crankshaft. The difference between the angular velocities of the ring portion 18 and the disc portion 14 being absorbed by pivotal movement of the disc portion 14 relative to the ring portion 18 as impeded by their spring pressed frictional engagement with each other.

An important feature of the device is that the springwashers 22 exert a greater pound per sq. in. pressure on the ring portion 18 at their edges 24 than does the ring portion 18 under the same spring load in turn exert on the disc portion 14 due to the relatively larger area of contact between the disc portion 14 and the ring portion 18. In other words, the spring load on the washers 22 causes the washers 22 to bite into the ring portion 18 so that movement is relatively easier between the disc portion 14 and the ring portion 18 and is relatively harder between the washers 22 and the ring portion 18. In this connection the cantilevered shank portions 25 of the studs 16 are adapted to flex when relative pivotal sliding movement occurs between the disc portion 14 and the ring portion 18 but does not occur between the washers 22 and the ring portion 18.

It is also important to note that the usual variations in crankshaft angular velocity are minute and that the cantilevered or projecting stud shank has sufficient flexibility to absorb them. Moreover, the size, resiliency, rigidity, and flexibility of the stud can be selected to suit the motor on which the inventive fly-wheel is mounted. Obviously, the size, power, and area of contact of the spring are also selected to obtain the desired resistance between the springs and the portion on which they bear as well as the portions themselves.

In the event that larger variations in crankshaft angular velocity are encountered exceeding the flexibility of the studs 16, the ring portion 18 is capable of moving not only relative to the disc portion 14 but also relative to the washers 22 such as caused by pre-ignition of fuel or backfiring conditions in the engine or sudden loading or unloading such as is incident to clutching and unclutching in changing gears or direction of drive.

Under normal operating conditions it has been found that the flexibility of the studs is sufficient to allow the relative movement between the parts demanded by the variations in crankshaft angular velocity when the stud diameter, length, flexibility and hardness are properly selected and properly co-ordinated with the amount of spring pressure applied in conjunction with the number of studs employed.

Fig. 3 shows a modification of the invention wherein the disc portion 30 and the ring portion 31 are movable relative to each other not only angularly but also radially as no mechanical means are employed to locate the portions radially relative to one another. The studs 32 and springs 33 are selected as in the device of Figs. 1 and 2. The angular characteristics of the device of Fig. 3 are the same as in the device of Figs. 1 and 2, however, the ring portion 31 and the disc portion 30 are free to develop individual dynamic balance during rotation, and, as the ring portion 31 is not impeded by mechanically attached parts it is capable of achieving a position approximating true dynamic balance. As the disc portion 30 is limited by attached parts relative to individually achieving dynamic balance, a radial difference may exist between the ring portion 31 and the disc portion 30. Due to the fact that the portions are in spring pressed frictional engagement at their contacting surfaces, the ring portion 31 dampens the radial vibration incident to the disc portion 30. The studs 32 flex angularly and radially under relatively small variations between the portion and the spring 33 slides relative to the ring portion 31 on which it bears under increased or larger variations.

Although but two embodiments of the invention have been shown and described in detail, it is obvious that many changes may be made in the size, shape, detail and arrangement of the various elements of the invention within the scope of the appended claims.

I claim:

1. A fly-wheel for damping vibration incident to angular velocity variations of a rotating shaft, said fly-wheel comprising a disc portion adapted to be secured to said shaft for angular movement therewith, an annular damping ring in frictional engagement with said disc portion, flexible means cantilevered from said disc portion and extending through slots in said ring in nonengaging relation with said ring, and resilient means secured to said flexible means clampingly engaging said ring for holding said ring in slippable frictional engagement with said disc portion and with said resilient means, said resilient means exerting a greater pressure on said ring than said ring exerts on said disc portion whereby relatively minor angular velocity variations of said shaft cause limited relative rotation of said ring and said disc portion via the flexibility of said flexible means and major angular velocity variations of said shaft cause said ring to be displaced relatively to both said disc portion and said resilient means.

2. A fly-wheel as set forth in claim 1 wherein said disc portion is provided with an outwardly projecting ridge, and said ring is provided with a mating groove receiving said ridge whereby radial displacement of said ring relatively to said disc portion is precluded.

JULIUS P. SHELL.

References Cited in the file of this patent
UNITED STATES PATENTS

| Number | Name | Date |
|---|---|---|
| 1,799,630 | Matthews | Apr. 7, 1931 |
| 1,830,600 | Fifield | Nov. 3, 1931 |
| 1,984,577 | Griswold | Dec. 18, 1934 |
| 2,092,571 | Cole | Sept. 7, 1937 |